Figure 1:
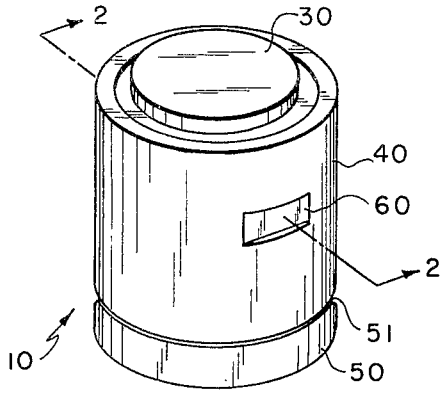
Figure 2:
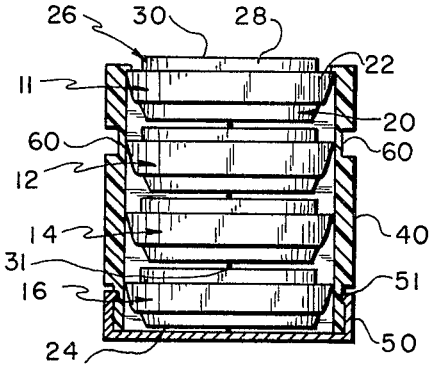
Figure 3:
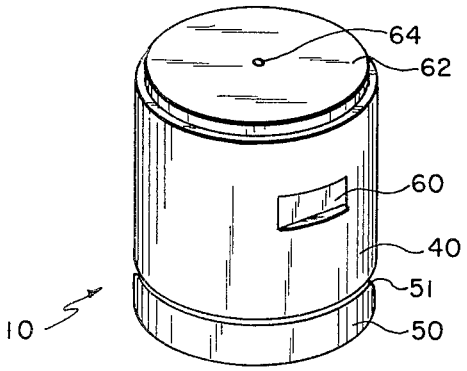

United States Defensive Publication [19] (H) [11] T958,012

Stoneham [43] May 3, 1977

[54] BATTERY

[76] Inventor: Jeffrey Richard Stoneham, 136 Frisbee Hill Road, Hilton, N.Y. 14468

[21] Appl. No.: 735,479

[22] Filed: Oct. 26, 1976

[51] Int. Cl.[2] ..... H01M 6/42

[52] U.S. Cl. ..... 429/157

[57] ABSTRACT

A battery formed of a plurality of disc-shaped cells of substantially the same voltage, connected in series and encased by an electrically nonconductive sheath to form a cylindrical unit having a positive terminal at one end and a negative terminal at the other end. The sheath contains an orientation groove for locating the battery in a predetermined orientation in a receiving compartment.

2 Claims, 1 Sheet Drawing,

6 Pages Specification

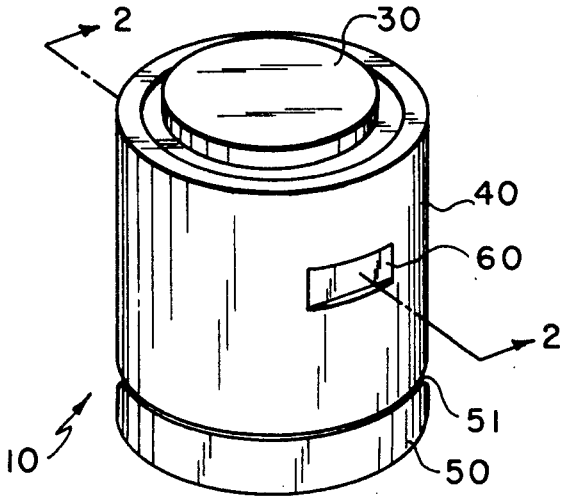

The file of this unexamined application may be inspected and copies thereof may be purchased (849 O.G. 1221, Apr. 9, 1968).